United States Patent [19]
Boezeman et al.

[11] Patent Number: 6,111,590
[45] Date of Patent: *Aug. 29, 2000

[54] METHOD AND SYSTEM FOR A TRUE SCALE MOTION PATH EDITOR TO CREATE MOTION PATHS AS INDEPENDENT ENTITIES

[75] Inventors: John J. Boezeman, Cary; Christopher Joseph Paul, Durham, both of N.C.

[73] Assignee: International Business Machines Corp., Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/896,815

[22] Filed: Jul. 18, 1997

[51] Int. Cl.⁷ .................................................. G06T 15/70
[52] U.S. Cl. ........................................... 345/474; 345/439
[58] Field of Search .................................. 345/474, 473, 345/433, 439, 472

[56] References Cited

U.S. PATENT DOCUMENTS

| | | | |
|---|---|---|---|
| 3,637,212 | 1/1972 | Hurley | 273/85 R |
| 5,261,041 | 11/1993 | Susman | 395/152 |
| 5,355,314 | 10/1994 | Feigenbaum | 364/420 |
| 5,425,139 | 6/1995 | Williams et al. | 395/152 |
| 5,510,995 | 4/1996 | Oliver | 364/474.24 |
| 5,572,639 | 11/1996 | Gantt | 395/133 |
| 5,577,185 | 11/1996 | Tunnell et al. | 395/173 |
| 5,594,856 | 1/1997 | Girard | 395/173 |
| 5,619,628 | 4/1997 | Fujita et al. | 395/127 |
| 5,678,001 | 10/1997 | Nagel et al. | 395/173 |
| 5,680,619 | 10/1997 | Gudmundson et al. | 395/701 |
| 5,692,144 | 11/1997 | Thrush | 395/339 |
| 5,758,180 | 5/1998 | Duffy et al. | 395/806 |
| 5,767,861 | 6/1998 | Kimura | 345/473 |
| 5,793,382 | 8/1998 | Yevazunis et al. | 345/474 |
| 5,818,462 | 10/1998 | Marks et al. | 345/473 |
| 5,943,056 | 8/1999 | Sato et al. | 345/419 |
| 5,982,389 | 11/1999 | Guenter et al. | 345/474 |

FOREIGN PATENT DOCUMENTS

| | | | |
|---|---|---|---|
| 0309373A2 | 3/1989 | European Pat. Off. | G06F 15/72 |
| 0709771A1 | 5/1996 | European Pat. Off. | G06F 9/44 |
| 2258790A | 2/1993 | United Kingdom | H06F 15/72 |
| 2303282A | 2/1997 | United Kingdom | H06T 13/00 |

OTHER PUBLICATIONS

Animated Software Documentation, *IBM Technical Disclosure Bulletin*, vol. 34, No. 10A, pp. 27–28 (Mar. 1992).

3D Studio Max Tutorial: ISBN No. 12801–00000–5041) by Autodesk: tutorial pp. 12–19 to 12–26, 1996.

Corel Draw 4.0 by Corel Corporation. (refer Corel Draw 4.0 user manual)–pp. 118 & 462, 1993.

Deke McClelland ("Fractal Design Expression"—MacWorld vol. v14 Issue: n3. Mar. 1, 1997).

Corel Draw 4 User Manual, Corel Corporation, Chapter 9: Shaping Objects, pp. 118, 1993.

*Primary Examiner*—Mark K. Zimmerman
*Assistant Examiner*—Mano Padmanabhan
*Attorney, Agent, or Firm*—A. Bruce Clay; Myers, Bigel, Sibley & Sajovec, P.A.

[57] ABSTRACT

Motion paths are created as independent entities in a multimedia motion path editor. A motion path is drawn in a path editor layout window without associating the path with an object in the layout area. The path is then saved for subsequent assignment to any desired object in the layout area. The saved path may be manipulated as any other object. A plurality of the saved paths may be joined together, and/or combined into one extrapolated path.

12 Claims, 18 Drawing Sheets

METHOD AND SYSTEM FOR A TRUE SCALE MOTION PATH EDITOR TO CREATE MOTION PATHS AS INDEPENDENT ENTITIES

CROSS REFERENCE TO RELATED APPLICATIONS

This Application is related in subject matter to the following Applications filed concurrently herewith and assigned to a common Assignee:

Application Ser. No. 08/896,817 filed by Boezeman, et al., entitled "Method and System for a True-Scale Motion Path Editor" (IBM Docket No. CR9-97-011); Application Ser. No. 08/896,848 filed by Boezeman, et al., entitled "Method and System for a True-Scale Motion Path Editor Using Time Segments, Duration and Synchronization" (IBM Docket No. CR9-97-060); and Application Ser. No. 08/896,818 filed by Boezeman, et al., entitled "Method and System for a True-Scale Motion Path Editor Using Proximity Detection/Reaction and Event Generation" (IBM Docket No. CR9-97-082).

The foregoing co-pending Applications are incorporated herein by reference.

The foregoing co-pending Applications are incorporated herein by reference.

FIELD OF THE INVENTION

This invention relates in general to computer software, and in particular to a method and system for defining the movement path of a multimedia object in an application development environment using motion paths as independent entities.

BACKGROUND OF THE INVENTION

In a multimedia application development environment, users often want to assign a path along which a part will move to give the application special effects. For example, a user might want to display an animation of a bird appearing on the left edge of a page and flying across the page to exit on the right side of the page. Using known techniques, the assignment of a motion path to a part is tedious. In addition, the known techniques have limited flexibility and require construction separate from the part layout area. Once constructed, it is difficult to modify the path.

One type of path definition is found in, for example, Premier by Adobe. To construct a path for an object/part, the part must be taken from the layout area and placed in a separate window. Then, the user can draw a path for the part using a pointing device. There is no one-to-one scale and the path is drawn without the perspective of the actual environment including lack of surrounding parts. Thus, the user must create the path and then assign it, return to the layout area and run a test. If the path does not look right, the user must return the part to the separate path definition window and try again. This is awkward and time consuming, especially in complex layouts.

Another type of path definition can be found in Director by Macromedia. This type of path definition allows the use of the actual layout area for construction but also requires the use of a "score" area. The user must drag the part to the start time in the score. Then the user must drag the part to the next movement position in the layout are followed by another dragging to the score area for the time it should appear in that position. Once these steps have occurred from start point to finish point, the score area is highlighted and the placement is made on the layout area. Thus, this method can also be slow and tedious.

If a user wants to store and reuse one of the paths created (especially in the case of a complex or particularly interesting path), the user is faced with almost no flexibility. In most cases, the entire layout including all the objects therein and any paths assigned thereto must be stored as an entity. Thus, a desired path is not only tied to the object for which it was created, but also to the other objects/parts in the same layout. Therefore, if the user wants to assign that motion path to another part/object, there is no simple and fast way to do so.

Thus, there is a need for a method and system for saving a defined path as an independent entity that is quick and easy to use, especially for complex arrangements of multiple parts and/or multiple paths.

SUMMARY OF THE INVENTION

The present invention relates to a method and system for creating motion paths as independent entities in a multimedia motion path editor. A motion path is drawn in a path editor layout window without associating the path with an object in the layout area. The path is then saved for subsequent assignment to any desired object in the layout area. The saved path may be manipulated as any other object. A plurality of the saved paths may be joined together, and/or combined into one extrapolated path.

These and other features, aspects, and advantages of the present invention will become better understood with reference to the following description, appended claims, and accompanying drawings.

BRIEF DESCRIPTION OF THE DRAWINGS

For a more complete understanding of the present invention and for further advantages thereof, reference is now made to the following Detailed Description taken in conjunction with the accompanying drawings, in which.

DETAILED DESCRIPTION OF THE INVENTION

Figure 1:
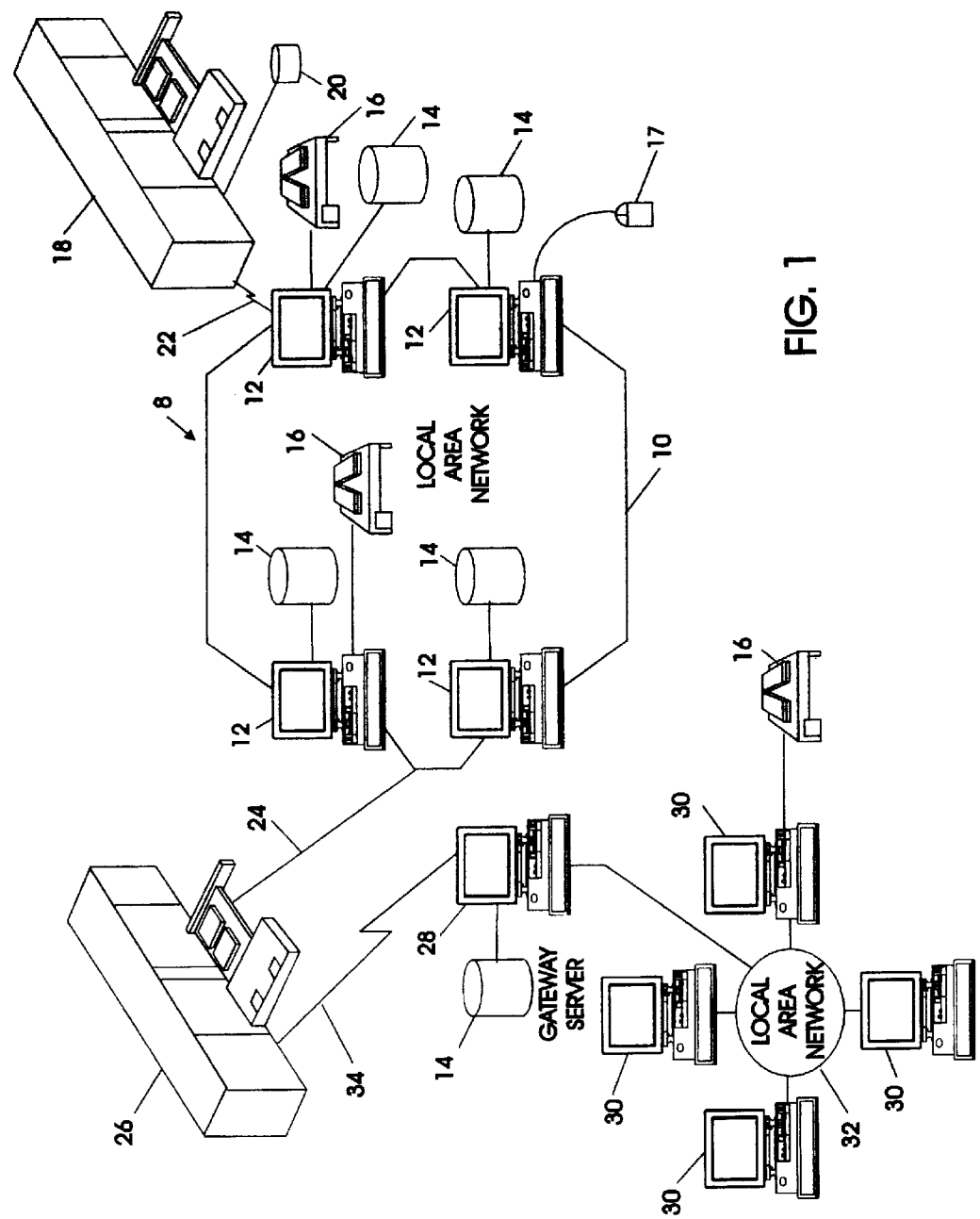
FIG. 1 is a pictorial representation of a data processing system which may be utilized to implement a method and system of the present invention.

Referring to FIG. 1, there is depicted a graphical representation of a data processing system 8, which may be utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network. Each said network may also consist of a plurality of processors coupled via a communications medium, such as shared memory, shared storage, or an interconnection network. As is common in such data processing systems, each individual computer may be coupled to a storage device 14 and/or a printer/output device 16 and may be provided with a pointing device such as a mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a sub-system control unit/communications controller 26 and communications link 34 to a gateway server 28. The gateway server 28 is preferably an IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within North Carolina and mainframe computer 18 may 10 be located in New York.

Software program code which employs the present invention is typically stored in the memory of a storage device 14 of a stand alone workstation or LAN server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

Figure 2:
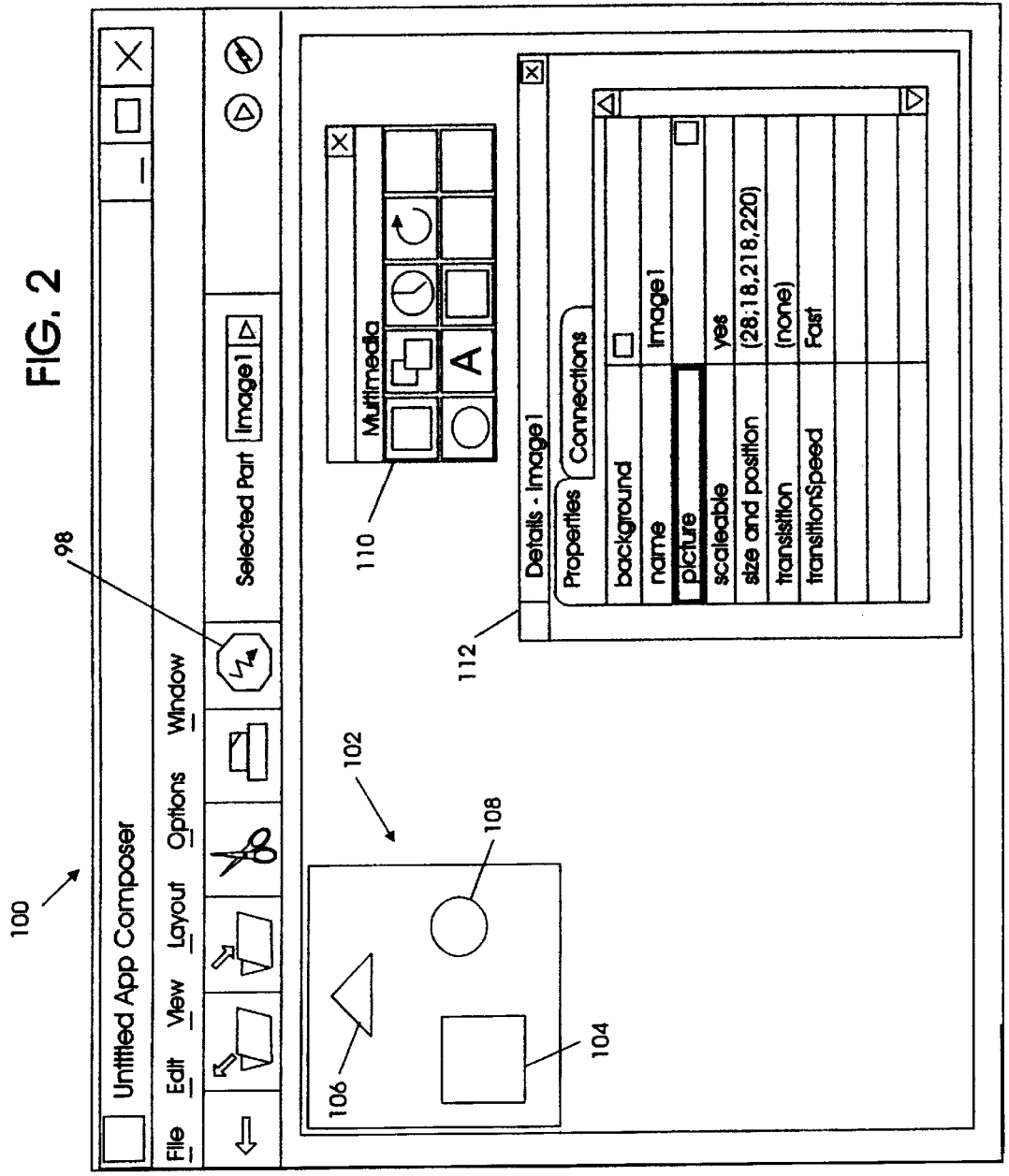
FIG. 2 is a graphical representation of a multimedia parts editor for use with the present invention.

Referring to FIG. 2, a graphical representation of a multimedia part editor is shown in window 100. Within the window 100 there appears a layout area, generally indicated by a reference numeral 102, in which a plurality of multimedia objects/parts, for example, square 104, triangle 106 and circle 108, are positioned for manipulation. A palette window 10 and a Details window 112 are also provided. The palette window 110 contains a collection of parts available for use in the current application being developed. These may include multimedia parts(image, sound, animation, etc) and/or controls (buttons, labels, listboxes, etc).

The Details window 112 is used to modify and customize the specific parts used in the current application and add logic between parts. A Properties tab 113 in the Details window 112 provides a method to modify the parts by allowing the user to customize specific characteristics of parts in the current application. For example, the picture property of an image part can be any source file (in the correct format) that the user desires. A Connections tab 115 of the Details window 112 provides a method to add logic between parts in the "part, event—part, action/property" format. For example, a user can add logic between a button and a sound file so that when the button is clicked, the sound file will play. This connection would read: "button clicked—sound play".

Figure 3:
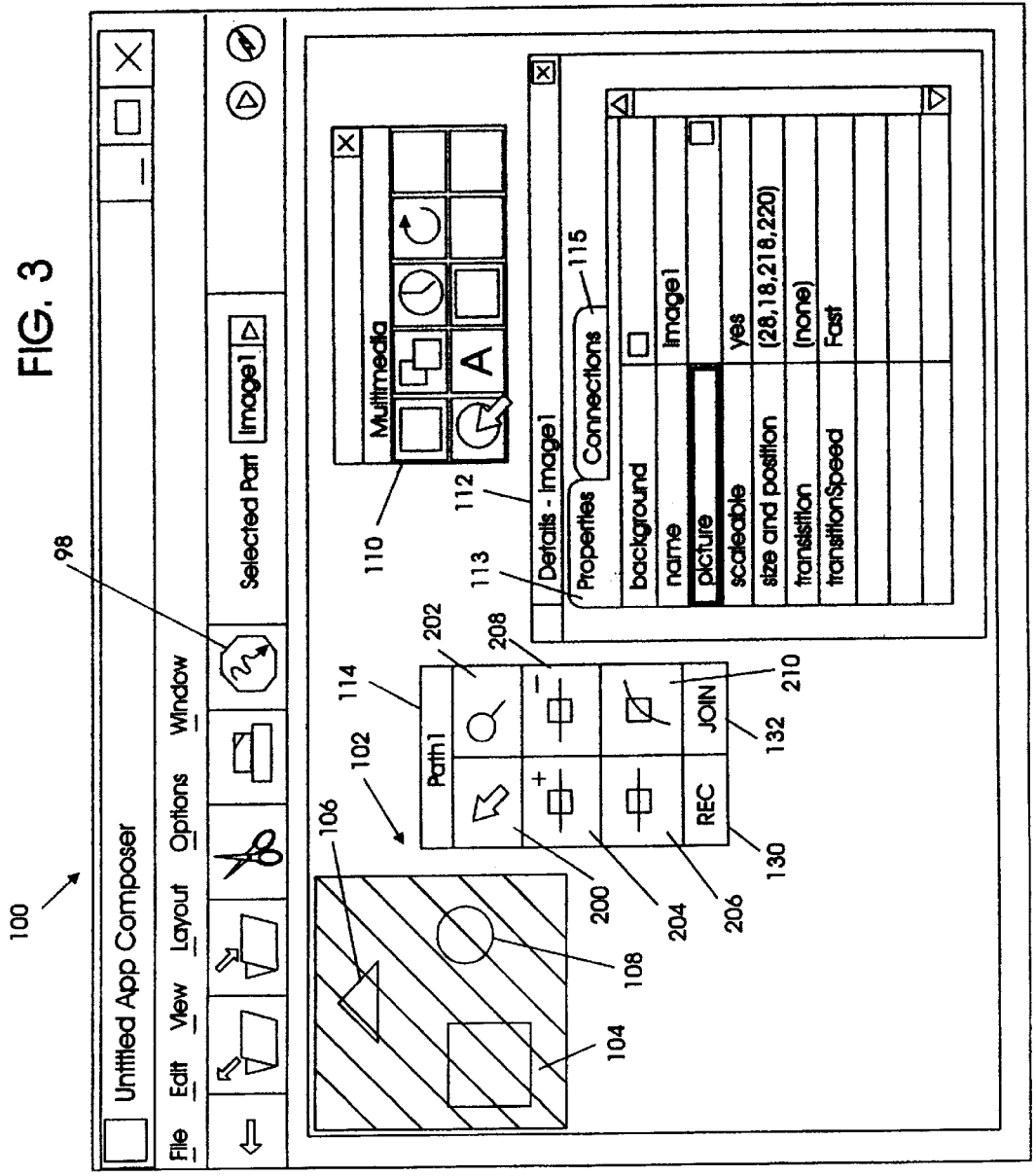
FIGS. 3,4 and 5 are graphical representations of the multimedia editor of FIG. 2 utilizing a path editor in accordance with the present invention.

Referring to FIG. 3, upon pressing a motion path button 98 on a main toolbar or by selecting "Motion Path Editor" (not shown) via an appropriate menu choice, a path editor window 114 appears adjacent to the layout area 102. A part specific path can also be created by first selecting a part to apply the path to and then pressing the motion path button 98 on the main toolbar or by selecting "Motion Path Editor" via the appropriate menu choice. The path window 114 is provided with a plurality of buttons and tools (which will be subsequently described in greater detail), including a "Record" push-button 130 and a "Join" push-button 132. In addition, all the parts/images within the layout area 102 are slightly ghosted when the motion path window 114 is first displayed, as indicated by the diagonal lines appearing therethrough.

Figure 4:
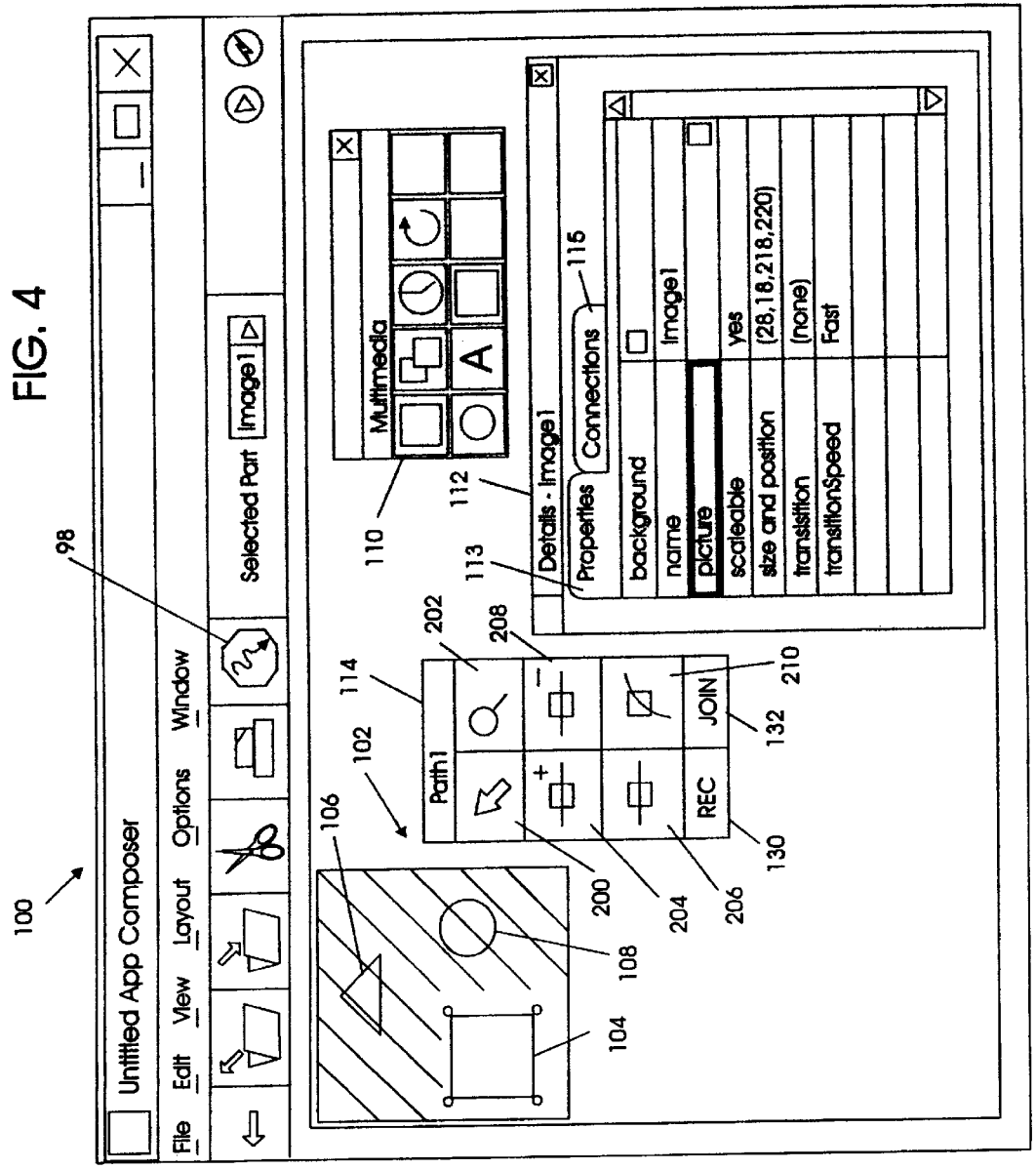

Referring to FIG. 4, the user has selected an object, for example, the square 104, to which a path will be assigned. As shown in FIG. 4, the square 104 has become unghosted (shown without diagonal lines). There are two methods for creating the motion path for square 104. First, the user can press the record push-button 130, and while holding the mouse button down, drag the square 104 manually in the layout area 102 to define a path. In the second method, the user can manually define individual points along which the square 104 will follow for its path.

Figure 5:
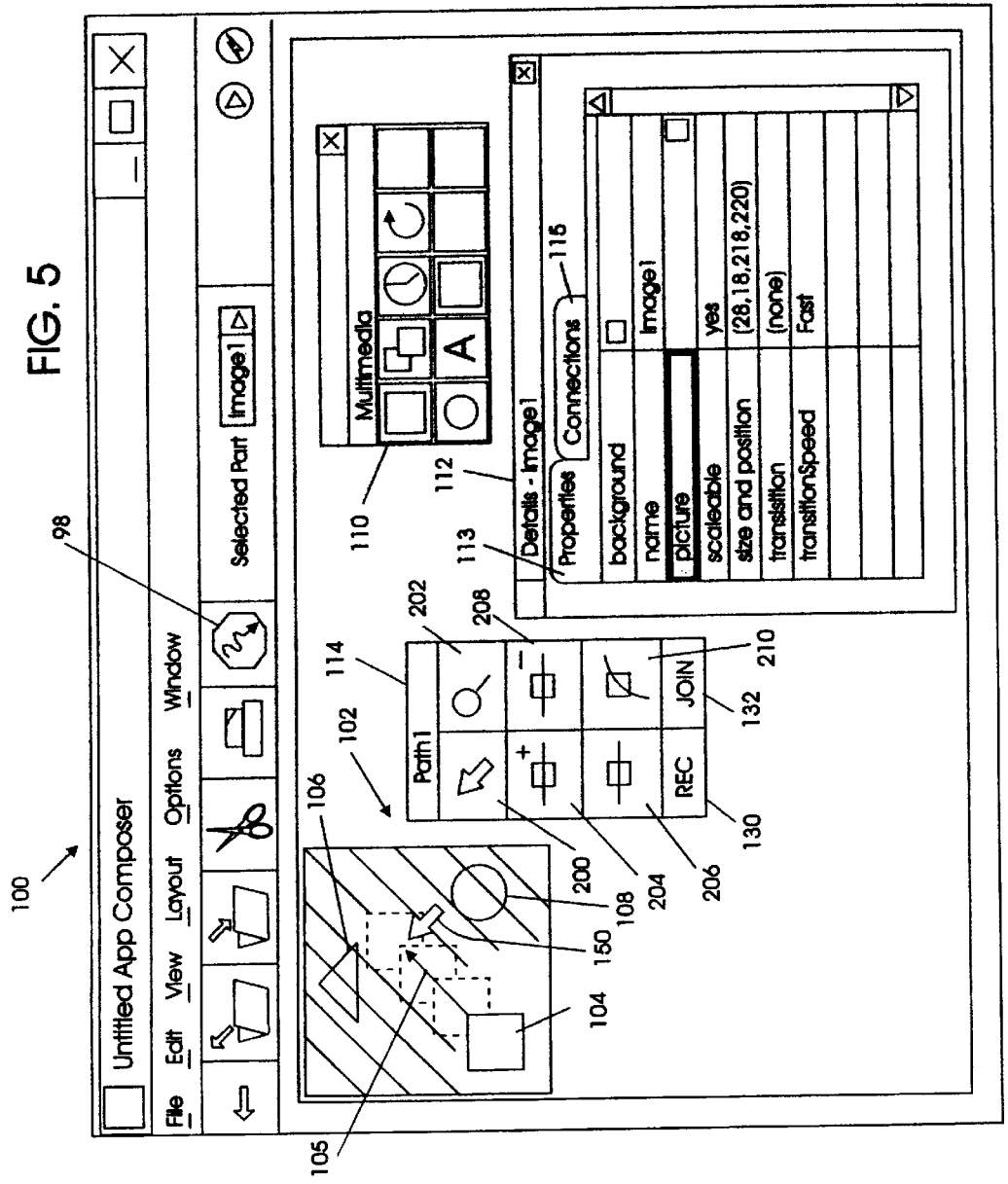

Referring to FIG. 5, an example of the manual drag technique to assign a path is shown. The user presses the Record push-button 130, and then places a cursor 150 over the object to be moved, for example, the square 104, and drags the object along a path (shown as line 105) of the desired movement. When the user has reached the point at which he/she would like the path to end, the user releases the mouse button and the path "record" activity ceases. When set into motion, the square 104 will then move along the path 105 as drawn.

Figure 6:
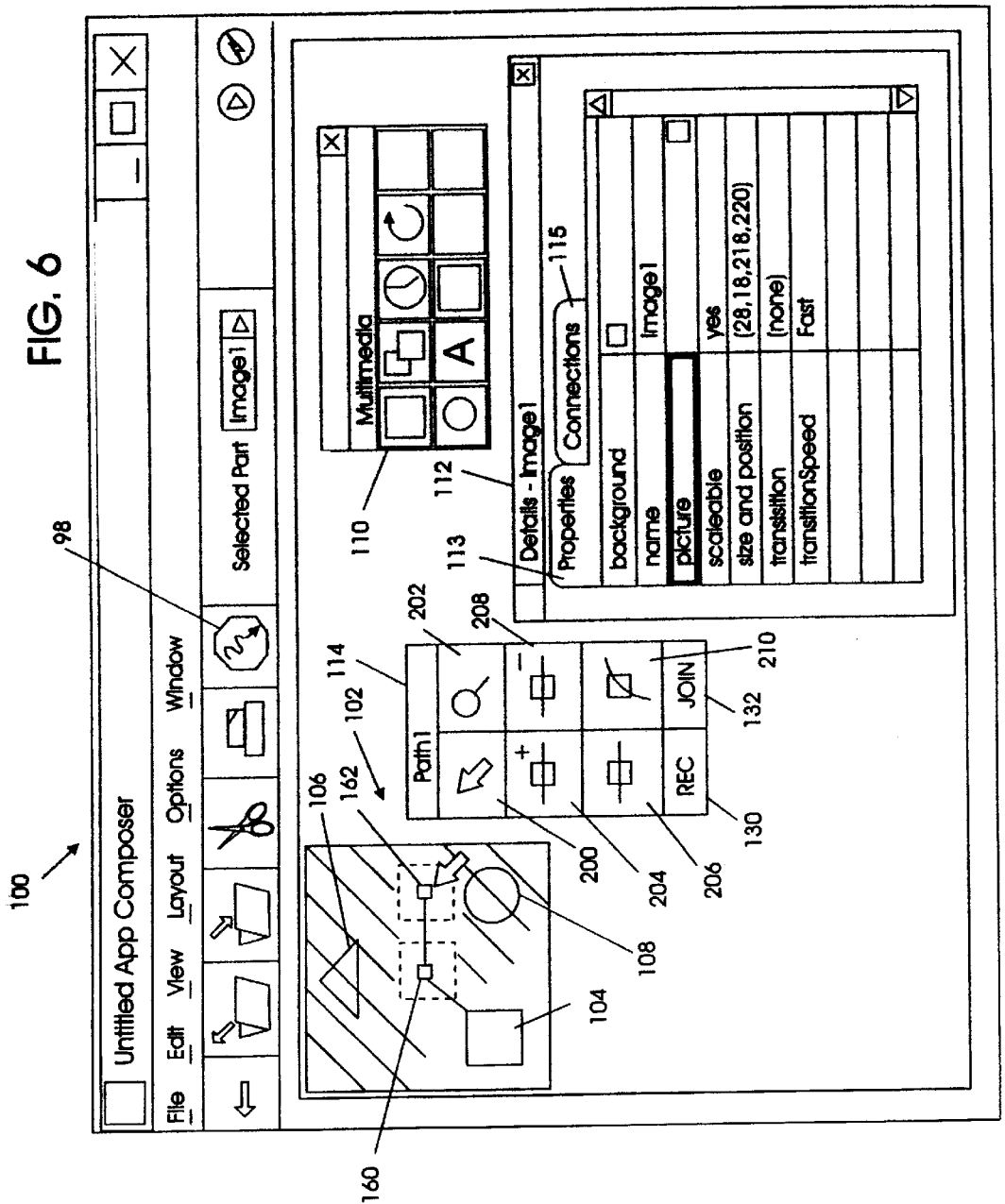
FIG. 6 illustrates definition of a path utilizing various anchor points.

Referring to FIG. 6, the setting of anchor points technique is shown. The user can define as many anchor points as desired, for example, anchor point 160 and anchor point 162 with the initial anchor point defined as the physical center (not shown) of the object. A connecting line is automatically drawn between anchor points as each subsequent anchor point is defined. To indicate the end of the path, the user double-clicks the mouse at the location of the end point, this action completes the path. When set in motion, the object (square 104) will then move along the path as defined by the anchor points.

Figure 7:
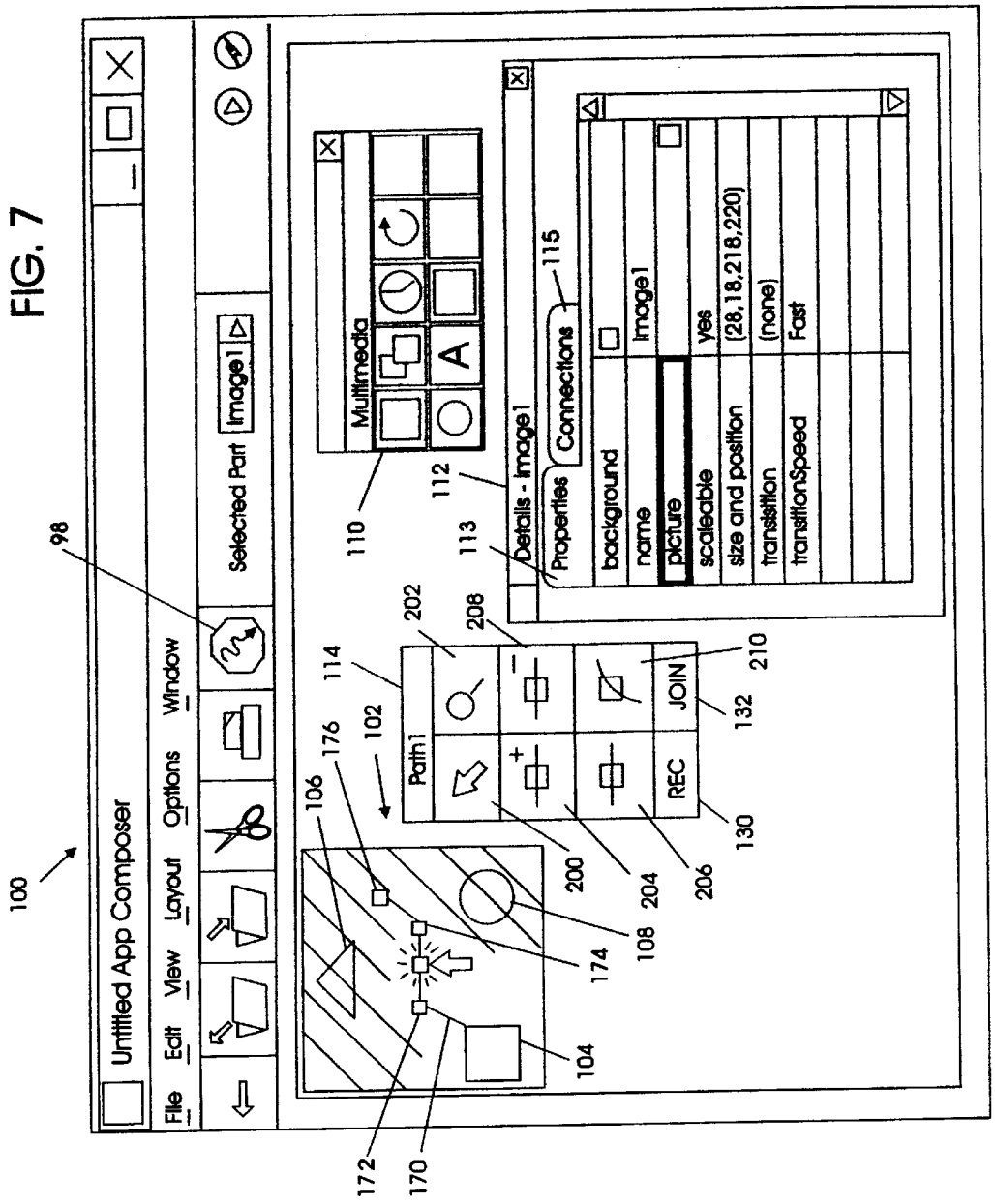
FIG. 7 illustrates addition or deletion of an anchor point to a path.

Referring to FIG. 7, having already defined a motion path as identified by line 170 from the square 104 through anchor points 172, 174 and 176, the user decides that the path 170 needs to be modified. To add a point on the path 170, the user selects an anchor point "Add" tool 204 from the path editor window 114 and moves the cursor 150 over the desired location for a new anchor point 171 and presses the mouse button. This adds the new anchor point 171 on the path 170. To delete an existing point from the path 170, the user selects the anchor point "Delete" tool 208 from the path editor window 114, moves the cursor 150 over the existing point to be deleted and presses the mouse button. This deletes the indicated anchor point from the path 170.

Figure 8:
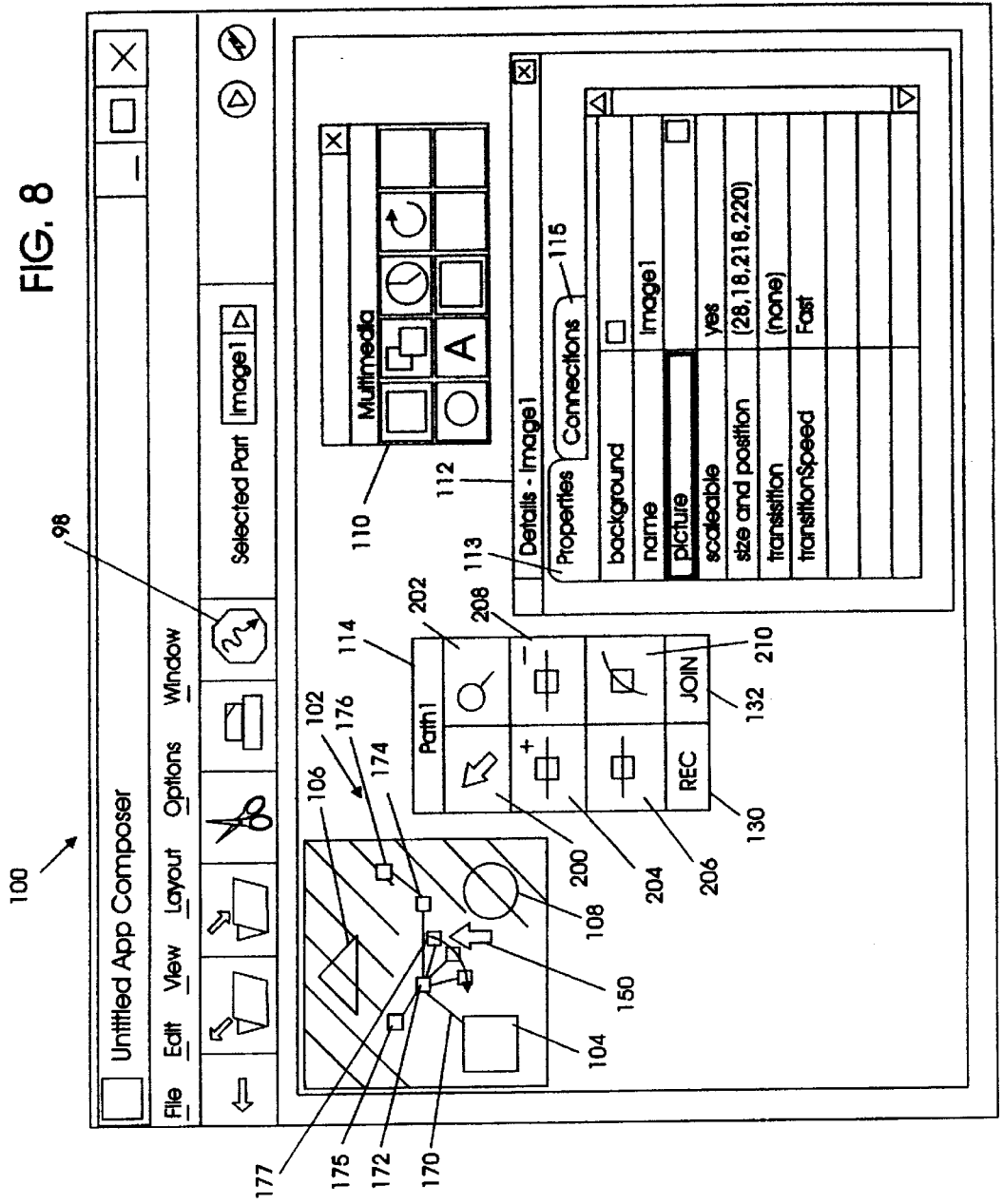
FIG. 8 illustrates definition of a curved path.

Referring to FIG. 8, a technique for curving a path is illustrated. The user defines a curve by simply holding and dragging the mouse as the anchor point is being laid, producing an anchor point with two handles 175 and 177 which the user can define and smooth the curve (as shown, handle 177 is dragged "clockwise"). Alternatively, the user can select the anchor point and press an anchor point "curve point" tool 210 in the path editor window 114. Similarly, to make a curve point anchor point into a straight line anchor point, the user can select the curve point anchor point on the layout area 102 and press an anchor point "straight line" tool 206 on the path editor window 114.

Figure 9:
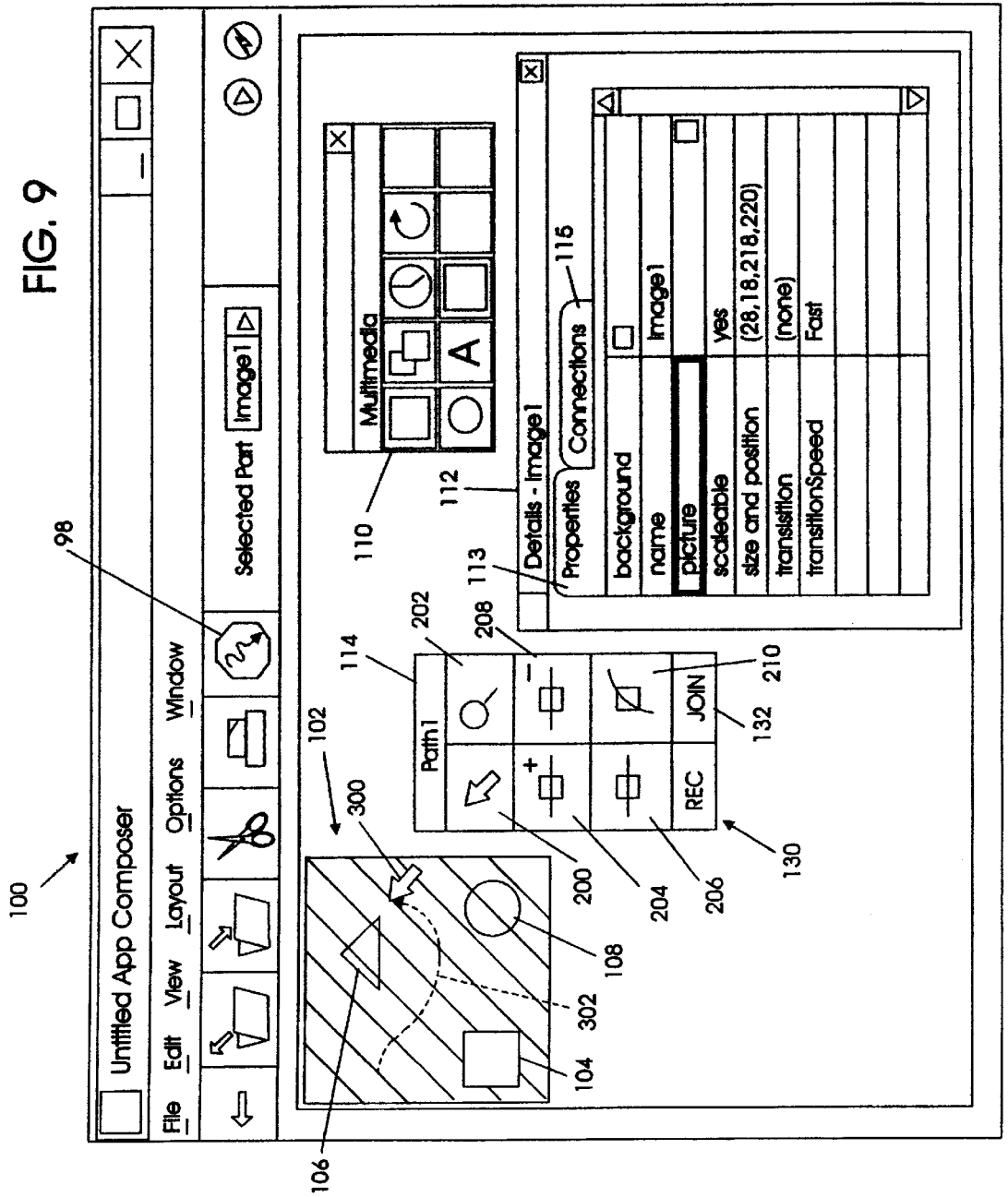
FIG. 9 illustrates the use of the present invention to create and store a path as an independent entity.

Referring to FIG. 9, an independent path entity is created in accordance with the present invention. As previously described above, a user has entered a motion path mode causing the layout area 102 to be ghosted (shown with diagonal lines). The user then selects Record 130, and using mouse pointer 300, may draw a path 302 in the layout area 102 separate from and independent of any objects therein. Additionally, the path 302 may be created with the use of anchor points, as previously described above. Once created, the path 302 may be saved and assigned to any object/part as desired, by selecting a "Save Path" command (not shown) from an appropriate menu choice and assigning a unique file name.

Figure 10:
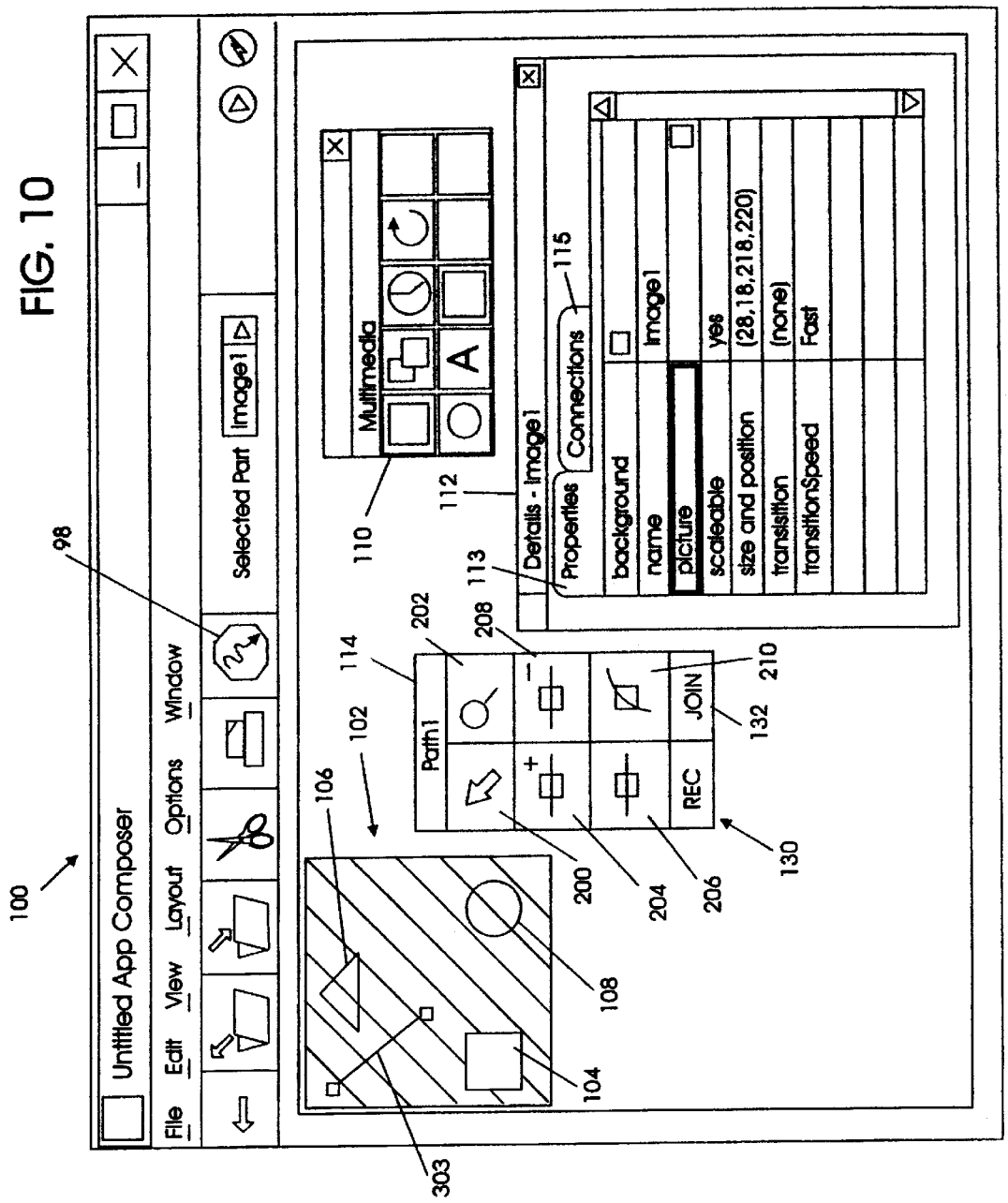
FIGS. 10–15 illustrate the use of the present invention to join multiple stored paths.
Figure 11:
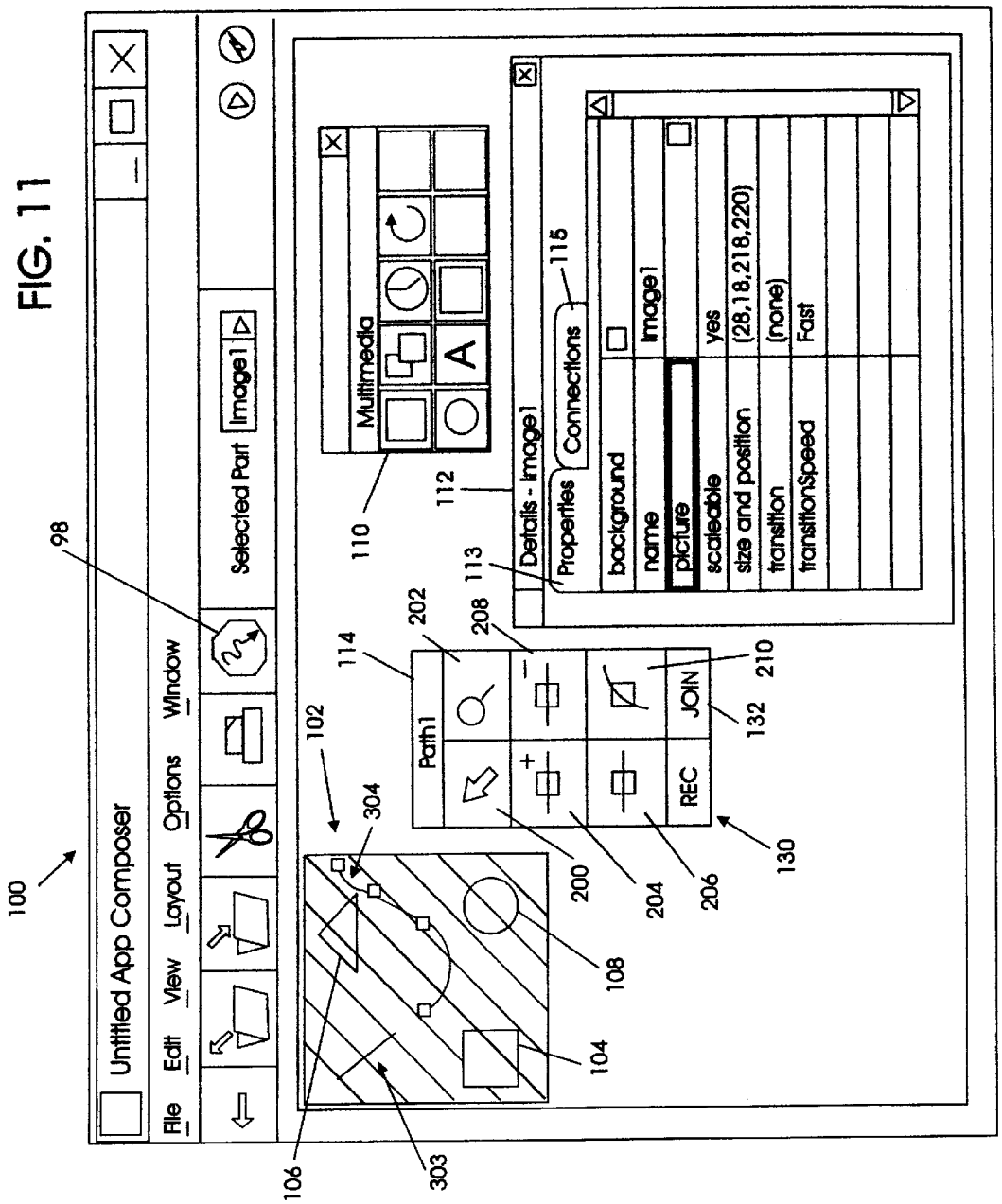

The present invention can also be used to join stored paths together. To join two or more independent, saved paths together, the user first loads the saved paths, one at a time, into the layout area 102. This is done by selecting a "Load Path" command (not shown) from an appropriate menu and selecting the desired path to load from the resulting dialog. FIG. 10 shows a first path 303 loaded into the layout area 102. Referring to FIG. 11, a second path 304 is subsequently loaded into the layout area 102 in the same manner. Although not shown, it is to be understood that additional saved paths can be loaded and placed into the layout area 102 in the same manner as described above. The paths 303 and 304 may then be manipulated or moved in the layout area 102, if desired.

Figure 12:
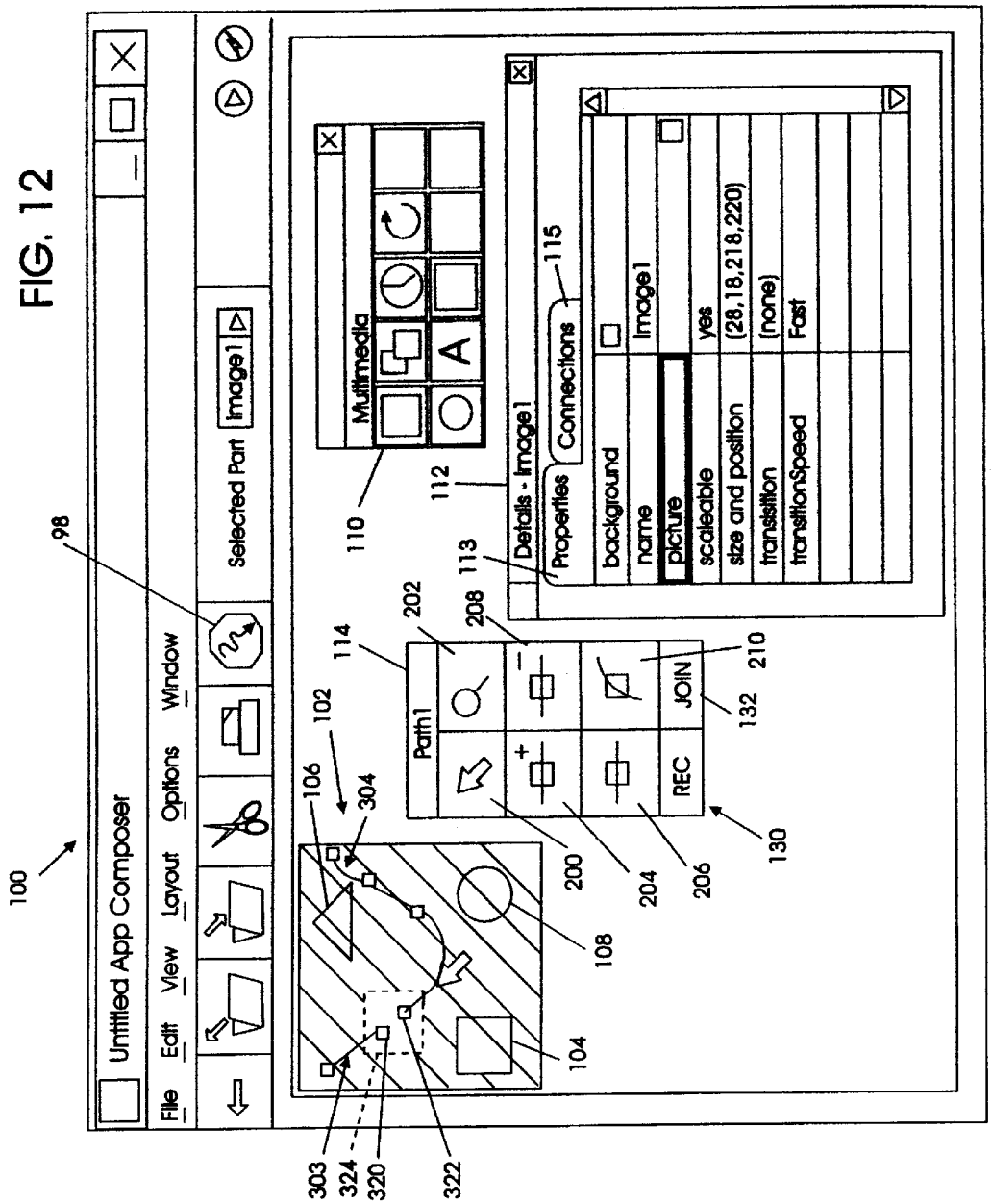

Once the paths 303 and 304 have been loaded and positioned as desired in the layout area 102, they can be joined together. Referring to FIG. 12, the user has selected adjacent endpoints 320 and 322 of the paths 303 and 304, respectively, by using area select (placing box 324 around the endpoints 320 and 322). As an alternative, for example, the user may also use a series of point and click commands to select the endpoints 320 and 322.

Figure 13:
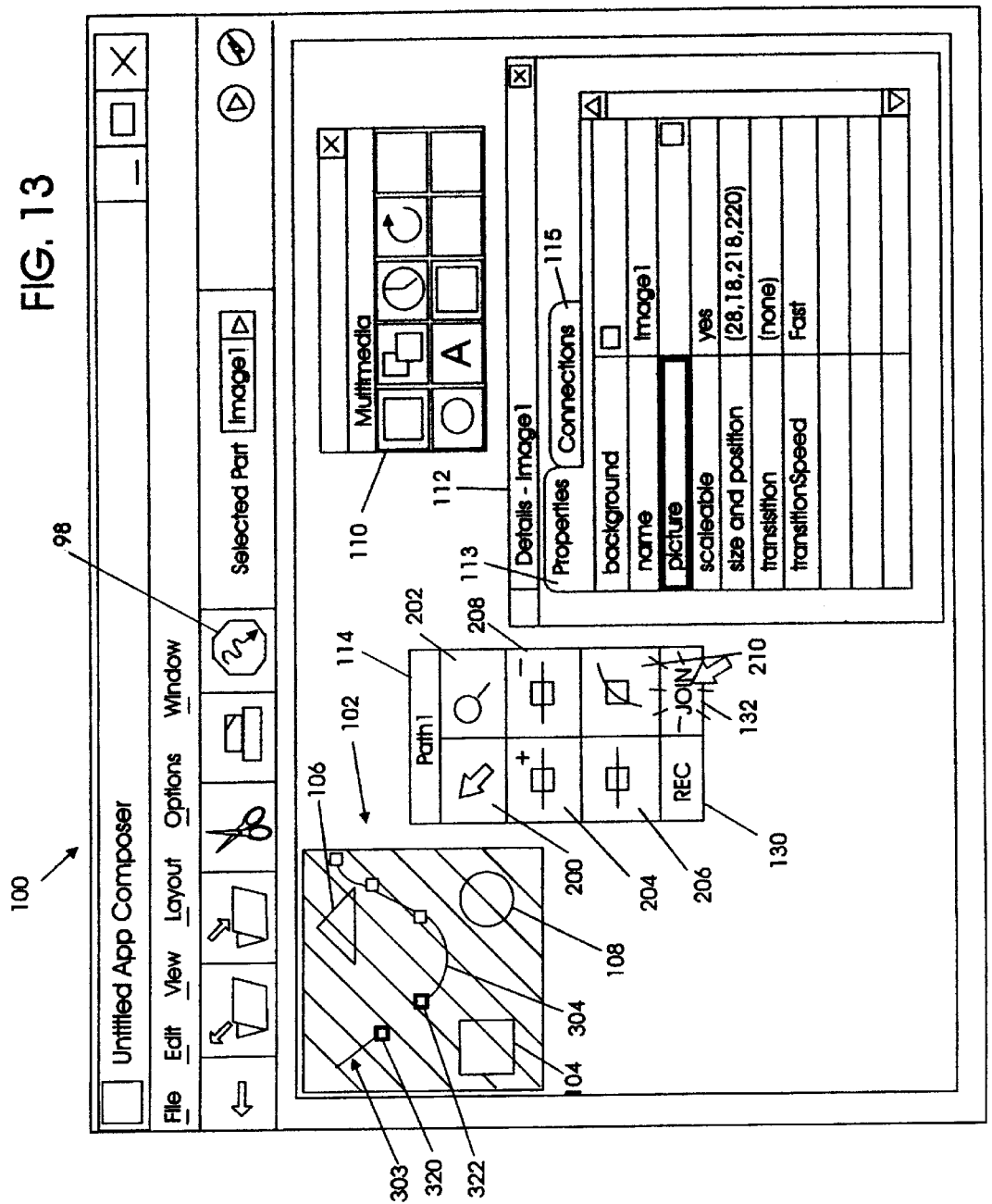
Figure 14:
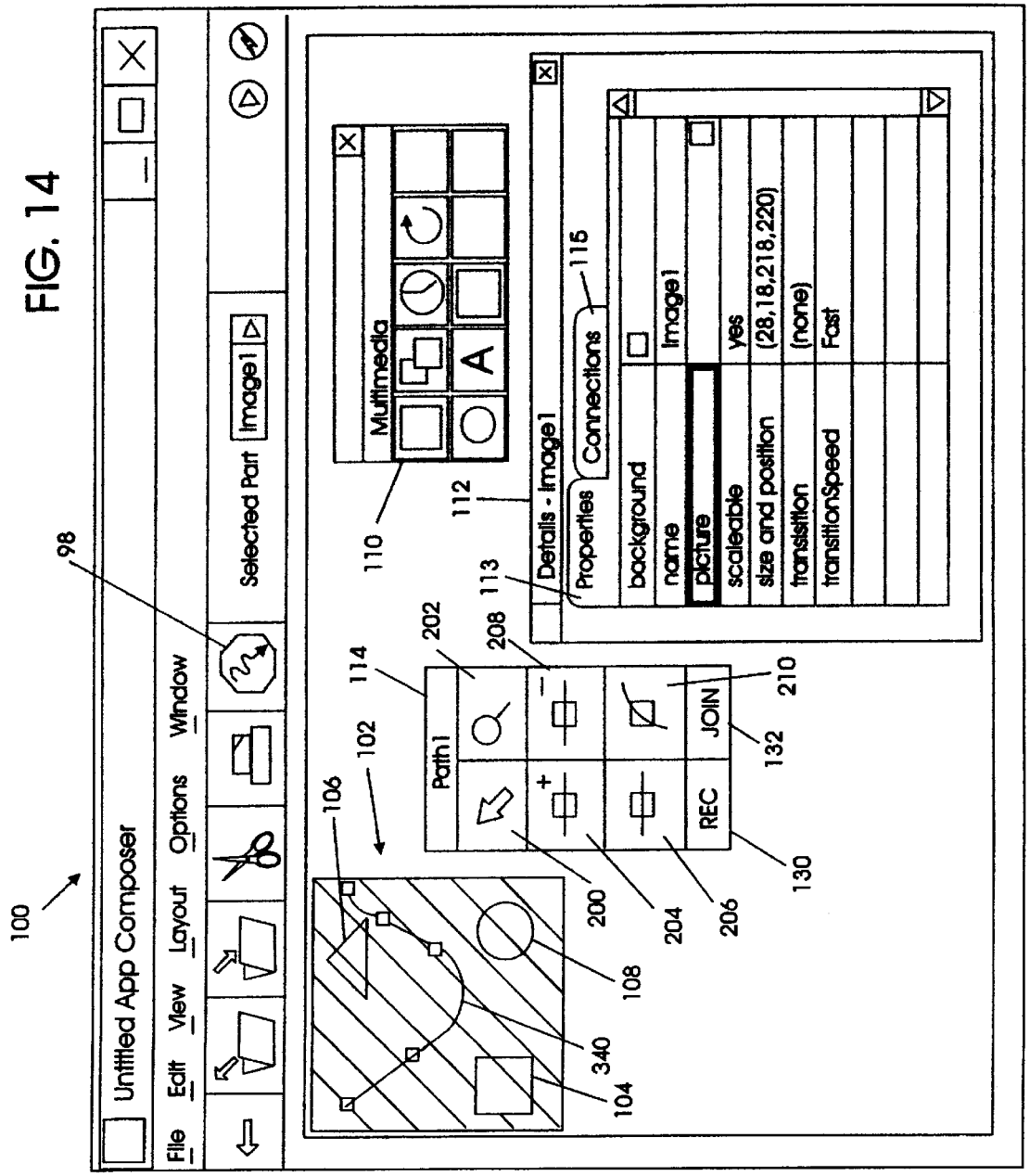

Referring to FIG. 13, once the two endpoints 320 and 322 are appropriately selected, the user presses the "Join" button 132 in the path editor window 114. This joins the two paths 303 and 304 together into one joined path 340 as shown in FIG. 14. This new path 340 may then be saved as an independent path and can be modified and manipulated, as previously described above.

Figure 15:
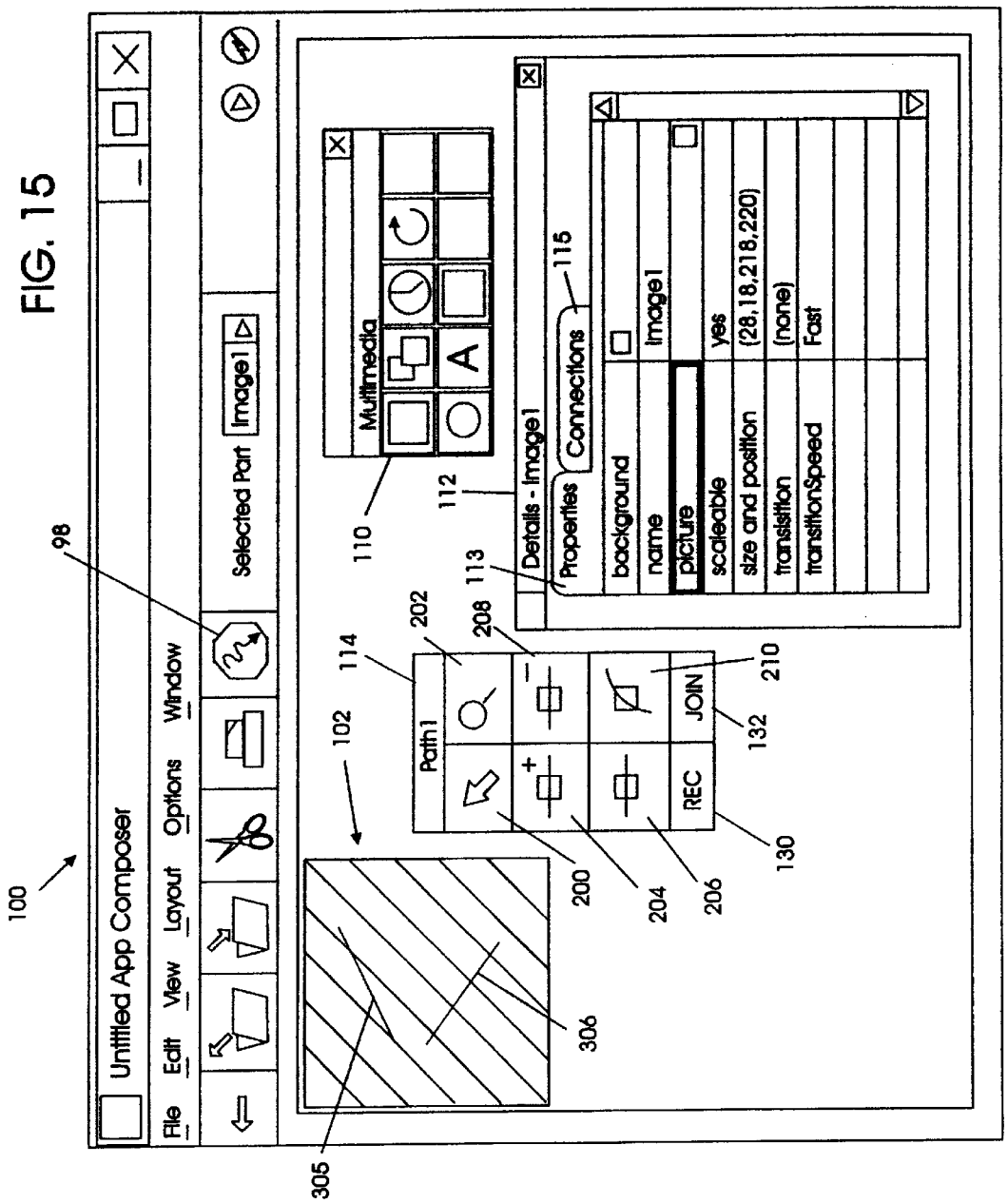

Importantly, the present invention is also used to create a single extrapolated motion path from two or more separate paths. Referring to FIG. 15, two independent motion paths 305 and 306 have already been created and defined, as previously described above. The motion paths 305 and 306 are positioned in the layout area 102. To create a single extrapolated path from the two motion paths 305 and 306, the user selects all or portions of each path that is to be extrapolated into a new third path.

Figure 16:
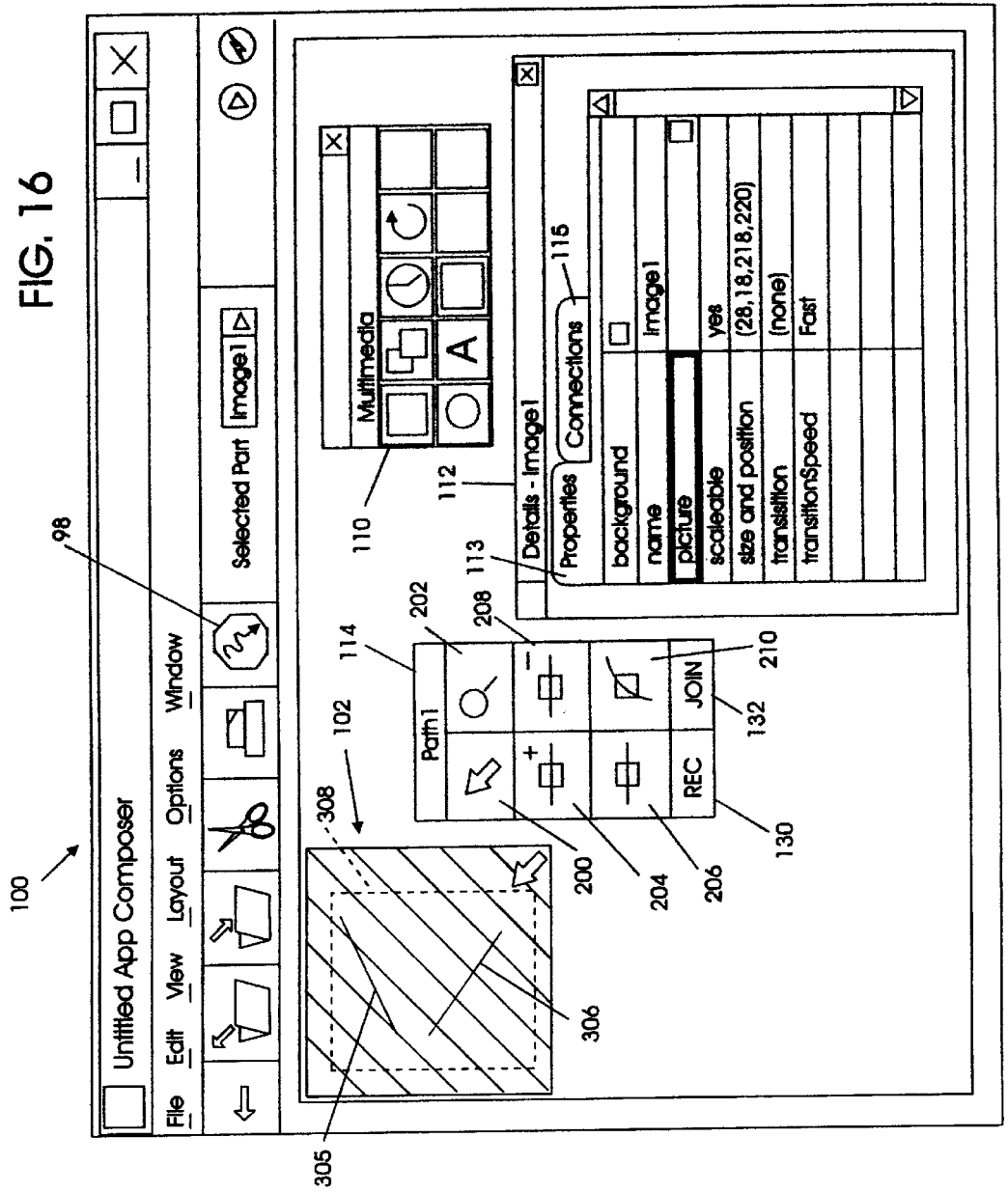
FIGS. 16–18 illustrate the use of the present invention to combine several stored paths into one extrapolated path.
Figure 17:
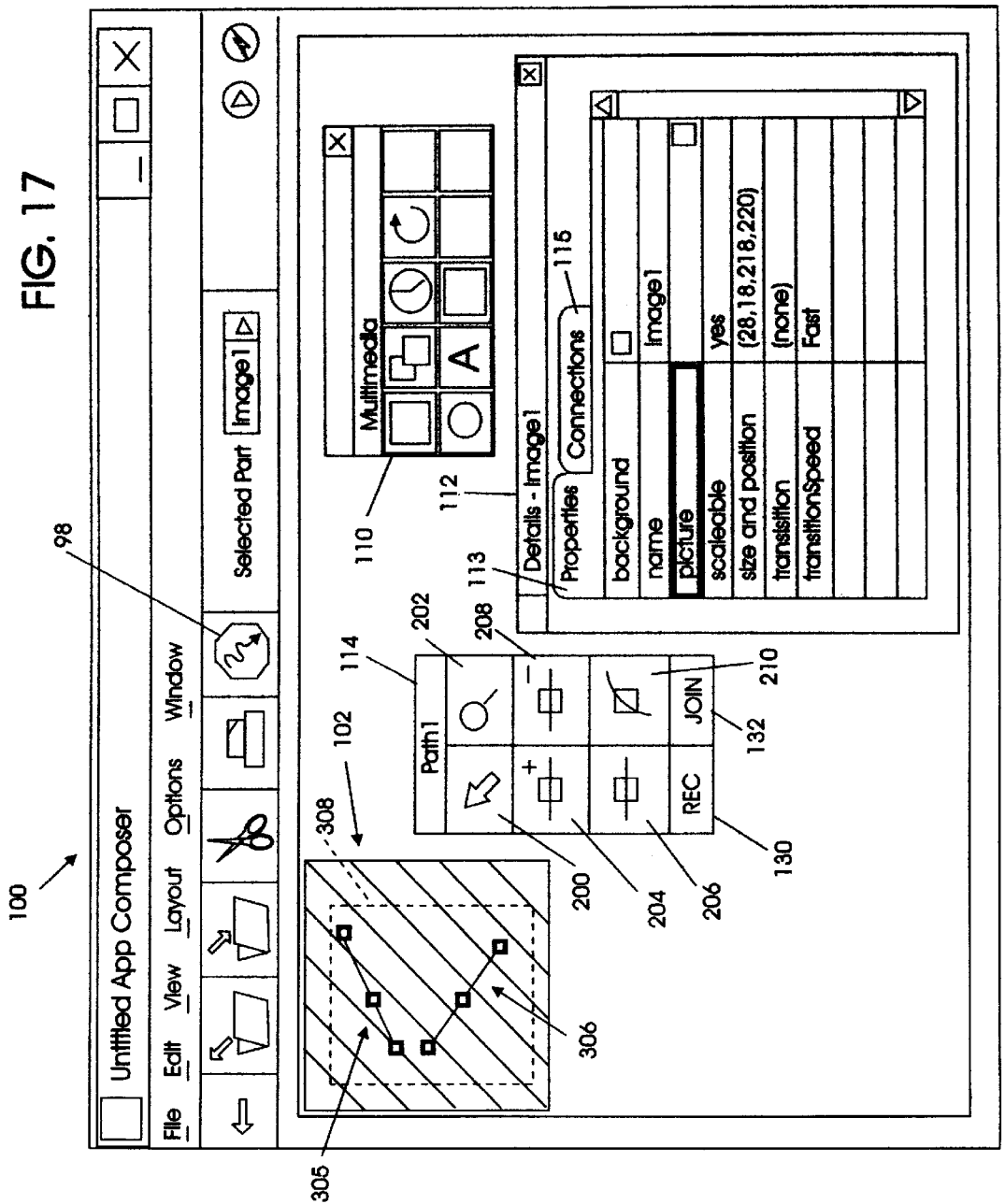

Referring to FIG. 16, the user has selected both paths 305 and 306 in their entirety by using area select (placing a box 308 around both paths 305 and 306). As an alternative, for example, the user may also use a series of point and click commands to select all the points that make up each of the paths 305 and 306 (see FIG. 17).

Figure 18:
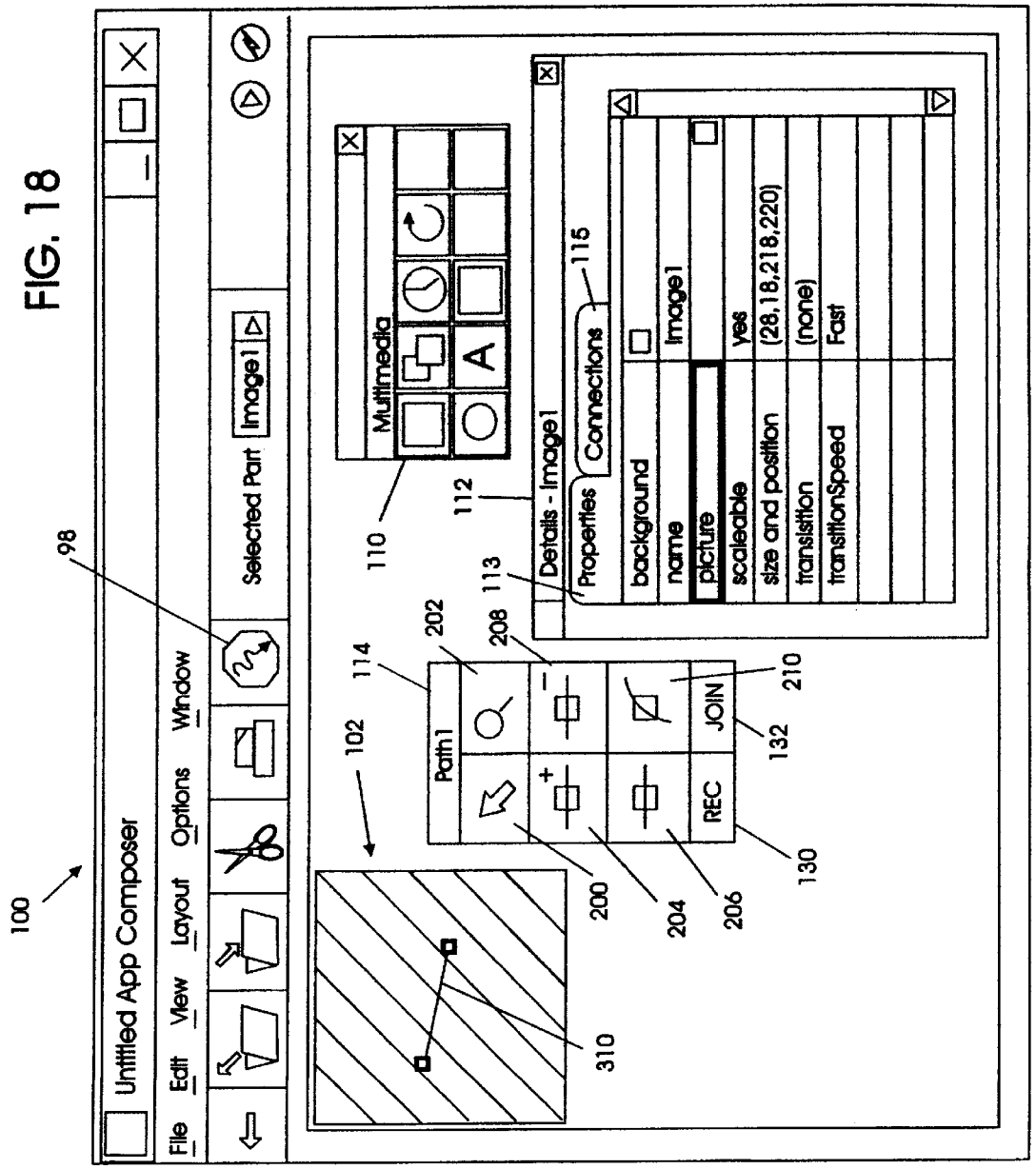

Once the paths 305 and 306 have been selected, the present invention extrapolates the paths 305 and 306 into a new, third path by selecting an "Extrapolate Paths" command (not shown) from the appropriate menu. The result, as shown in FIG. 18, is a new path 310 comprised of an average of the "X" and "Y" coordinates of the paths 305 and 306. The new path 310 can be saved, modified and manipulated in the same manner as any other path, as described previously herein.

Although the present invention has been described with respect to a specific preferred embodiment thereof, various changes and modifications may be suggested to one skilled in the art and it is intended that the present invention encompass such changes and modifications as fall within the scope of the appended claims.

What is claimed is:

1. A method of creating motion paths as independent entities in a multimedia motion path editor, comprising the steps of:

drawing a motion path in a path editor layout window which displays multimedia objects without associating said path with the multimedia objects displayed in said layout area;

saving said path for subsequent assignment to any desired multimedia object displayed in said layout area;

repeatedly performing the steps of drawing a motion path and saving said path to thereby define a plurality of said saved paths that do not intersect one another; and combining the plurality of said saved paths into one extrapolated path which has no points in common with the plurality of saved paths.

2. The method of claim 1, further comprising the step of:
   manipulating said saved path as an object.

3. The method of claim 1, further comprising the step of:
   joining the plurality of said saved paths together to provide a joined path; and
   saving the joined path.

4. A method according to claim 1, wherein the step of combining a plurality of saved paths comprises the step of averaging the plurality of saved paths to provide one extrapolated path.

5. A system for creating motion paths as independent entities in a multimedia motion path editor, comprising:

means for drawing a motion path in a path editor layout window which displays multimedia objects without associating said path with the multimedia objects displayed in said layout area;

means for saving said path for subsequent assignment to any desired multimedia object displayed in said layout area; and means for combining a plurality of said saved paths into one extrapolated path wherein which has no points in common with the plurality of saved paths.

6. The system of claim 5, further comprising:
   means for manipulating said saved path as an object.

7. The system of claim 5, further comprising:
   means for joining a plurality of said saved paths together to provide a joined path; and
   means for saving the joined path.

8. A system according to claim 5, wherein the means for combining a plurality of saved paths comprises means for averaging the plurality of saved paths to provide one extrapolated path.

9. A program product on computer readable medium for creating motion paths as independent entities in a multimedia motion path editor, comprising:

computer readable means for drawing a motion path in a path editor layout window which displays multimedia objects without associating said path with the multimedia objects displayed in said layout area;

computer readable means for saving said path for subsequent assignment to any desired multimedia object displayed in said layout area; and computer readable means for combining a plurality of said saved paths into one extrapolated path wherein which has no points in common with the plurality of saved paths.

10. The program product of claim 9, further comprising:

computer readable means for manipulating said saved path as an object.

11. The program product of claim 9, further comprising:

computer readable means for joining a plurality of said saved paths together to provide a joined path; and computer readable means for saving the joined path.

12. A program product according to claim 9, wherein the computer readable means for combining a plurality of saved paths comprises computer readable means for averaging the plurality of saved paths to provide one extrapolated path.

\* \* \* \* \*